US007184053B2

(12) United States Patent
Correa et al.

(10) Patent No.: US 7,184,053 B2
(45) Date of Patent: Feb. 27, 2007

(54) METHOD FOR PROCESSING VIDEO DATA FOR A DISPLAY DEVICE

(75) Inventors: Carlos Correa, Villingen-Schwenningen (DE); Sébastien Weitbruch, Monchweiler (DE); Rainer Zwing, Villingen-Schwenningen (DE)

(73) Assignee: Thomson Licensing, Boulogne-Billancourt (FR)

( * ) Notice: Subject to any disclaimer, the term of this patent is extended or adjusted under 35 U.S.C. 154(b) by 480 days.

(21) Appl. No.: 10/239,284

(22) PCT Filed: Mar. 9, 2001

(86) PCT No.: PCT/EP01/02668

§ 371 (c)(1),
(2), (4) Date: Sep. 20, 2002

(87) PCT Pub. No.: WO01/71702

PCT Pub. Date: Sep. 27, 2001

(65) Prior Publication Data

US 2003/0103059 A1 Jun. 5, 2003

(30) Foreign Application Priority Data

Mar. 22, 2000 (EP) .................................. 00250099

(51) Int. Cl.

*G09G 5/02* (2006.01)
*G09G 3/28* (2006.01)
*H04N 1/405* (2006.01)
*G06K 15/00* (2006.01)
*G09G 3/00* (2006.01)
*G09G 5/10* (2006.01)

(52) U.S. Cl. ...................... 345/589; 345/690; 345/596; 345/63; 358/3.13; 358/3.14; 358/3.17

(58) Field of Classification Search ................ 345/596, 345/690, 691, 503, 473, 60–69, 72, 89, 692, 345/589, 592, 593, 597, 600, 428, 588, 613–614, 345/214; 347/240.24, 1; 358/1.9, 144, 1.1, 358/3.03, 515–519, 534, 3.06, 3.13, 3.14, 358/3.16, 3.19; 348/798, 910, 557, 577, 348/582; 315/169.4

See application file for complete search history.

(56) References Cited

U.S. PATENT DOCUMENTS

| | | | | | |
|---|---|---|---|---|---|
| 3,937,878 | A * | 2/1976 | Judice | ........................ | 348/798 |
| 5,301,269 | A | 4/1994 | Alcorn et al. | ............... | 395/158 |
| 5,712,657 | A * | 1/1998 | Eglit et al. | .................. | 345/690 |
| 5,714,974 | A | 2/1998 | Liu | ............................ | 345/149 |
| 6,094,453 | A * | 7/2000 | Gosselin et al. | ....... | 375/240.24 |
| 6,731,407 | B1 * | 5/2004 | Hayama | ..................... | 358/3.2 |
| 6,894,664 | B2 * | 5/2005 | Thebault et al. | .............. | 345/60 |
| 2002/0005854 | A1 * | 1/2002 | Deering et al. | ............. | 345/596 |
| 2002/0190931 | A1 * | 12/2002 | Thebault et al. | .............. | 345/63 |

FOREIGN PATENT DOCUMENTS

| | | | |
|---|---|---|---|
| EP | 656 616 | A1 | 6/1995 |
| EP | 831 450 | A2 | 3/1998 |

* cited by examiner

*Primary Examiner*—Wesner Sajous
(74) *Attorney, Agent, or Firm*—Joseph J. Laks; Harvey D. Fried; Sammy S. Henig

(57) ABSTRACT

The invention is related to a new kind of pre-processing for plasma display panel control. The plasma display technology has the drawback of a reduced grey scale portrayal. This is due to the fact that contrarily to CRTs where luminance is approximately quadratic to the applied cathode voltage, luminance is linear to the number of discharge pulses in PDPs. Therefore, an approximately quadratic degamma function has to be applied to the input video signal components R,G,B before sub-field coding can be done. Truncation to 8-bit video data is required, so that the effect of the degamma function cannot be fully maintained. Especially in the region of small video levels, where the eye sensitivity is high, the grey scale portrayal is poor.

According to the invention it is proposed to use a new kind of dithering, adapted to the PDP specialities to improve the grey scale portrayal. These adaptation includes three dithering specialities which can be used singly or in combination. These are:

cell-based dithering, i.e. to each color component R, G, B of a pixel separate dithering numbers are added;

object/region-based dithering, i.e. the set of disposable dithering numbers is made dependent on the region/object in the video picture;

the set of disposable dithering numbers is made dependent on the video (signal) level.

10 Claims, 3 Drawing Sheets

| FRAME 1 | R | G | B | R | G | B | R | G |
|---|---|---|---|---|---|---|---|---|
| line 1 | 7 | 3 | 6 | 2 | 7 | 3 | 6 | 2 |
| line 2 | 0 | 4 | 1 | 5 | 0 | 4 | 1 | 5 |
| line 3 | 6 | 2 | 7 | 3 | 6 | 2 | 7 | 3 |
| line 4 | 1 | 5 | 0 | 4 | 1 | 5 | 0 | 4 |

| FRAME 2 | R | G | B | R | G | B | R | G |
|---|---|---|---|---|---|---|---|---|
| line 1 | 4 | 0 | 5 | 1 | 4 | 0 | 5 | 1 |
| line 2 | 3 | 7 | 2 | 6 | 3 | 7 | 2 | 6 |
| line 3 | 5 | 1 | 4 | 0 | 5 | 1 | 4 | 0 |
| line 4 | 2 | 6 | 3 | 7 | 2 | 6 | 3 | 7 |

| FRAME 3 | R | G | B | R | G | B | R | G |
|---|---|---|---|---|---|---|---|---|
| line 1 | 2 | 6 | 3 | 7 | 2 | 6 | 3 | 7 |
| line 2 | 5 | 1 | 4 | 0 | 5 | 1 | 4 | 0 |
| line 3 | 3 | 7 | 2 | 6 | 3 | 7 | 2 | 6 |
| line 4 | 4 | 0 | 5 | 1 | 4 | 0 | 5 | 1 |

| FRAME 4 | R | G | B | R | G | B | R | G |
|---|---|---|---|---|---|---|---|---|
| line 1 | 1 | 5 | 0 | 4 | 1 | 5 | 0 | 4 |
| line 2 | 6 | 2 | 7 | 3 | 6 | 2 | 7 | 3 |
| line 3 | 0 | 4 | 1 | 5 | 0 | 4 | 1 | 5 |
| line 4 | 7 | 3 | 6 | 2 | 7 | 3 | 6 | 2 |

Fig. 3

METHOD FOR PROCESSING VIDEO DATA FOR A DISPLAY DEVICE

This application claims the benefit under 35 U.S.C. § 365 of International Application PCT/EP01/02668, filed Mar. 9, 2001, which claims the benefit of European Patent Application No. 00250099.9, filed Mar. 22, 2000.

The invention relates to a method and apparatus for processing video picture data for display on a display device. More specifically the invention is closely related to a kind of video processing for improving the picture quality of pictures which are displayed on matrix displays like plasma display panels (PDP) or other display devices where the pixel values control the generation of a corresponding number of small lighting pulses on the display.

BACKGROUND

The Plasma technology now makes it possible to achieve flat colour panel of large size (out of the CRT limitations) and with very limited depth without any viewing angle constraints.

Referring to the last generation of European TV, a lot of work has been made to improve its picture quality. Consequently, a new technology like the Plasma one has to provide a picture quality as good or better than standard TV technology. On one hand, the Plasma technology gives the possibility of "unlimited" screen size, of attractive thickness . . . but on the other hand, it generates new kinds of artefacts which could degrade the picture quality.

Most of these artefacts are different as for CRT TV pictures and that makes them more visible since people are used to see the old TV artefacts unconsciously.

A Plasma Display Panel (PDP) utilizes a matrix array of discharge cells which could only be "ON" or "OFF". Also unlike a CRT or LCD in which grey levels are expressed by analogue control of the light emission, a PDP controls the grey level by modulating the number of light pulses per frame (sustain pulses). This time-modulation will be integrated by the eye over a period corresponding to the eye time response.

Since the video amplitude determines the number of light pulses, occurring at a given frequency, more amplitude means more light pulses and thus more "ON" time. For this reason, this kind of modulation is also known as PWM, pulse width modulation.

This PWM is responsible for one of the PDP image quality problems: the poor grey scale portrayal quality, especially in the darker regions of the picture. This is due to the fact, that the displayed luminance is linear to the number of pulses, but the eye response and its sensitivity to noise is not linear. In darker areas the eye is more sensitive than in brighter areas. This means that even though modern PDPs can display e.g. 255 discrete video levels for each colour component R,G,B, the quantisation error will be quite noticeable in the darker areas. Further on, the required degamma function in PDP displays, increases quantisation noise in video dark areas, resulting in a perceptible lack of resolution.

There are known some solutions which use a dithering method for reducing the perceptibility of quantisation noise. These solutions are however not oriented to the nature of the display and of the displayed video. Proposed dithering methods in the literature were mainly developed to improve quality of non-moving black and white images (fax application and newspaper photo portrayal). The obtained results are therefore not optimal if the same dithering algorithms are directly applied to PDPs.

INVENTION

To overcome the drawback of reduced grey scale portrayal, the present invention, reports a dithering technique adapted to the specific problems in PDPs.

To achieve a better grey scale portrayal, a dithering signal is added to the video signal, before truncation to the final video grey scale amplitude bit resolution. As mentioned before, dithering per se is a well-known technique from the technical literature, used to reduce the effects of quantisation noise due to a reduced number of displayed resolution bits. With dithering, some artificial levels are added in-between the existing video levels. This improves the grey scale portrayal, but on the other hand adds high frequency, low amplitude dithering noise which is perceptible to the human viewer only at a small viewing distance.

The solution according to the invention makes an adaptation of the dithering signal to the PDP specialities in order to achieve an optimised grey-scale portrayal and a minimised dithering noise at the same time. There are three concrete techniques which can be used singly or in combination for the optimisation. These are:

- Cell-based dithering: adaptation to the cell structure of the plasma display.
- Object-based dithering: adaptation to the structure of the displayed video picture.
- Amplitude-based dithering: adaptation to the amplitude level of the pixels or pixel regions in the displayed video picture.

Cell-based dithering consists in adding a dithering signal that is defined for every plasma cell (there are 3 plasma cells R,G,B for each pixel) and not for every pixel. This makes the dithering noise finer and less noticeable to the human viewer.

Object-based dithering means enabling addition of a dithering signal only for certain picture content objects, or to adapt the set of disposable dithering numbers to the bit resolution of the displayed objects. In other words, the bit resolution for the dithering numbers is made adaptive to the bit resolution of the displayed objects. Two examples will help to clarify this idea:

1. OSD (On-Screen Display) is mostly generated with 4-bits of resolution per colour component R,G,B. This means that the display grey scale resolution (8 bit for each colour component R,G,B) is more than enough to correctly portray this kind of OSD, and therefore adding a dithering signal would only add dithering noise, without bringing a noticeable benefit.
2. If a PC graphic card is connected to the plasma display, for instance in 256-color mode, it is also useless to add a dithering signal. The bit resolution for each colour component R,G,B is also very low in this mode. Use of a dithering technique would not improve the grey scale portrayal. It is likely that the graphics card would add in series an own dithering signal to compensate for the reduced number of colours.

Amplitude-based dithering means that the set of disposable dithering numbers is made a function of the amplitude of the video signal components. Also here, in other words, this could be expressed that the bit resolution for the dithering numbers is made adaptive to the video signal component amplitude. Contrary to the smaller (darker) video values, large values of video do not loose bit resolution with the application of the quadratic degamma function. Therefore, the number of dithering bits can be reduced as a function of the amplitude.

Further advantageous embodiments are apparent from the dependent claims.

DRAWINGS

Exemplary embodiments of the invention are illustrated in the drawings and are explained in more detail in the following description.

FIG. 3 shows an illustration of a 3-dimensional cell-based dithering pattern;

EXEMPLARY EMBODIMENTS

Figure 1:
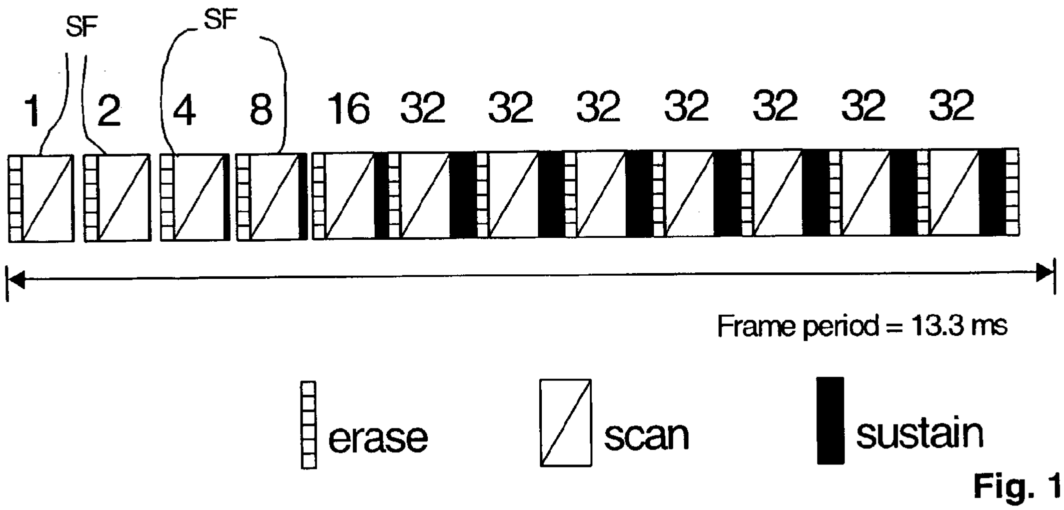
FIG. 1 shows an illustration for the plasma cell activation with small pulses in sub-fields.
Figure 2:
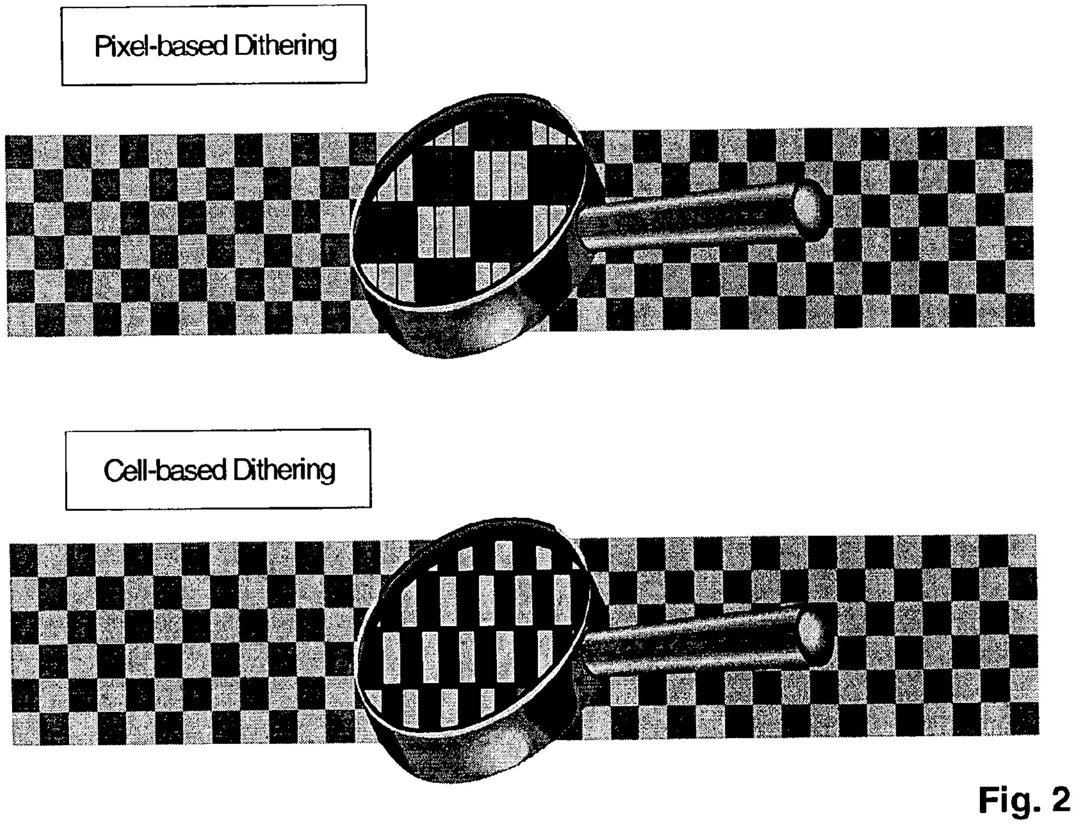
FIG. 2 shows an illustration for pixel-based and cell-based dithering.

In FIG. 1, the general concept of light generation in plasma display panels is illustrated. As mentioned before, a plasma cell can only be switched on or off. Therefore, the light generation is being done in small pulses where a plasma cell is switched on. The different colours are produced by modulating the number of small pulses per frame period. To do this a frame period is subdivided in so called sub-fields SF. Each sub-field SF has assigned a specific weight which determines how many light pulse are produced in this sub-field SF. Light generation is controlled by sub-field code words. A sub-field code word is a binary number which controls sub-field activation and inactivation. Each bit being set to 1 activates the corresponding sub-field SF. Each bit being set to 0 inactivates the corresponding sub-field SF. In an activated sub-field SF the assigned number of light pulses will be generated. In an inactivated sub-field there will be no light generation. A typical sub-field organisation with 12 sub-fields SF is shown in FIG. 1. The sub-field weights are listed at the top of the figure.

The frame period is illustrated slightly longer than all the sub-field periods together. This has the reason that for non-standard video sources the video line may be subject of jittering and to make sure that all sub-fields SF fits into the jittering video line, the total amount of time for all sub-fields SF is slightly shorter than a standard video line.

For clarification, a definition of the term sub-field is given here: A sub-field is a period of time in which successively the following is being done with a cell:

1. There is a writing/addressing period in which the cell is either brought to an excited state with a high voltage or with lower voltage to a neutral state.
2. There is a sustain period in which a gas discharge is made with short voltage pulses which lead to corresponding short lighting pulses. Of course only the cells previously excited will produce lighting pulses. There will not be a gas discharge in the cells in neutral state.
3. There is an erasing period in which the charge of the cells is quenched.

As mentioned before, plasma uses PWM (pulse width modulation) to generate the different shades of grey. Contrarily to CRTs where luminance is approximately quadratic to the applied cathode voltage, Luminance is linear to the number of discharge pulses in PDPs. Therefore, an approximately quadratic degamma function has to be applied to the input video signal components R,G,B before the PWM.

The effect of this degamma function on the input video data is shown in the following table, where a quadratic degamma function is applied (calculated with 16-bit resolution). After applying the quadratic degamma function to the input video data, in the next column the effect of this degamma function is depicted. The numbers in this column were achieved after dividing the quadratic numbers in the previous column by 256 and truncation. By doing this it is assured that the output video range and the input video range is identical.

| 8 Bit Input Video Data (X) | 16 Bit Degamma Data (X**2) | 8 Bit Output Video Data (X**2/255) | 11 Bit Degamma Data (X**2)/32 | 8 Bit Input Video Data (X) | 16 Bit Degamma Data (X**2) | 8 Bit Output Video Data (X**2/255) | 11 Bit Degamma Data (X**2)/32 |
|---|---|---|---|---|---|---|---|
| 0 | 0 | 0 | 0 | 128 | 16384 | 64 | 512 |
| 1 | 1 | 0 | 0 | 129 | 16641 | 65 | 520 |
| 2 | 4 | 0 | 0 | 130 | 16900 | 66 | 528 |
| 3 | 9 | 0 | 0 | 131 | 17161 | 67 | 536 |
| 4 | 16 | 0 | 0 | 132 | 17424 | 68 | 544 |
| 5 | 25 | 0 | 0 | 133 | 17689 | 69 | 552 |
| 6 | 36 | 0 | 1 | 134 | 17956 | 70 | 561 |
| 7 | 49 | 0 | 1 | 135 | 18225 | 71 | 569 |
| 8 | 64 | 0 | 2 | 136 | 18496 | 72 | 578 |
| 9 | 81 | 0 | 2 | 137 | 18769 | 73 | 586 |
| 10 | 100 | 0 | 3 | 138 | 19044 | 74 | 595 |
| 11 | 121 | 0 | 3 | 139 | 19321 | 75 | 603 |
| 12 | 144 | 0 | 4 | 140 | 19600 | 76 | 612 |
| 13 | 169 | 0 | 5 | 141 | 19881 | 77 | 621 |
| 14 | 196 | 0 | 6 | 142 | 20164 | 79 | 630 |
| 15 | 225 | 0 | 7 | 143 | 20449 | 80 | 639 |
| 16 | 256 | 1 | 8 | 144 | 20736 | 81 | 648 |
| 17 | 289 | 1 | 9 | 145 | 21025 | 82 | 657 |
| 18 | 324 | 1 | 10 | 146 | 21316 | 83 | 666 |
| 19 | 361 | 1 | 11 | 147 | 21609 | 84 | 675 |
| 20 | 400 | 1 | 12 | 148 | 21904 | 85 | 684 |
| 21 | 441 | 1 | 13 | 149 | 22201 | 87 | 693 |
| 22 | 484 | 1 | 15 | 150 | 22500 | 88 | 703 |
| 23 | 529 | 2 | 16 | 151 | 22801 | 89 | 712 |

-continued

| 8 Bit Input Video Data (X) | 16 Bit Degamma Data (X**2) | 8 Bit Output Video Data (X**2/255) | 11 Bit Degamma Data (X**2)/32 | 8 Bit Input Video Data (X) | 16 Bit Degamma Data (X**2) | 8 Bit Output Video Data (X**2/255) | 11 Bit Degamma Data (X**2)/32 |
|---|---|---|---|---|---|---|---|
| 24 | 576 | 2 | 18 | 152 | 23104 | 90 | 722 |
| 25 | 625 | 2 | 19 | 153 | 23409 | 91 | 731 |
| 26 | 676 | 2 | 21 | 154 | 23716 | 93 | 741 |
| 27 | 729 | 2 | 22 | 155 | 24025 | 94 | 750 |
| 28 | 768 | 3 | 24 | 156 | 24336 | 95 | 760 |
| 29 | 841 | 3 | 26 | 157 | 24649 | 96 | 770 |
| 30 | 900 | 3 | 28 | 158 | 24964 | 97 | 780 |
| 31 | 961 | 3 | 30 | 159 | 25281 | 99 | 790 |
| 32 | 1024 | 4 | 32 | 160 | 25600 | 100 | 800 |
| 33 | 1089 | 4 | 34 | 161 | 25921 | 101 | 810 |
| 34 | 1156 | 4 | 36 | 162 | 26244 | 102 | 820 |
| 35 | 1225 | 4 | 38 | 163 | 26569 | 104 | 830 |
| 36 | 1296 | 5 | 40 | 164 | 26896 | 105 | 840 |
| 37 | 1369 | 5 | 42 | 165 | 27225 | 106 | 850 |
| 38 | 1444 | 5 | 45 | 166 | 27556 | 108 | 861 |
| 39 | 1521 | 5 | 47 | 167 | 27889 | 109 | 871 |
| 40 | 1600 | 6 | 50 | 168 | 28224 | 110 | 882 |
| 41 | 1681 | 6 | 52 | 169 | 28561 | 112 | 892 |
| 42 | 1764 | 6 | 55 | 170 | 28900 | 113 | 903 |
| 43 | 1849 | 7 | 57 | 171 | 29241 | 114 | 913 |
| 44 | 1936 | 7 | 60 | 172 | 29584 | 116 | 924 |
| 45 | 2025 | 7 | 63 | 173 | 29929 | 117 | 935 |
| 46 | 2116 | 8 | 66 | 174 | 30276 | 118 | 946 |
| 47 | 2209 | 8 | 69 | 175 | 30625 | 120 | 957 |
| 48 | 2304 | 9 | 72 | 176 | 30976 | 121 | 968 |
| 49 | 2401 | 9 | 75 | 177 | 31329 | 122 | 979 |
| 50 | 2500 | 9 | 78 | 178 | 31684 | 124 | 990 |
| 51 | 2601 | 10 | 81 | 179 | 32041 | 125 | 1001 |
| 52 | 2704 | 10 | 84 | 180 | 32400 | 127 | 1012 |
| 53 | 2809 | 11 | 87 | 181 | 32761 | 128 | 1023 |
| 54 | 2916 | 11 | 91 | 182 | 33124 | 129 | 1035 |
| 55 | 3025 | 11 | 94 | 183 | 33489 | 131 | 1046 |
| 56 | 3136 | 12 | 98 | 184 | 33856 | 132 | 1058 |
| 57 | 3249 | 12 | 101 | 185 | 34225 | 134 | 1069 |
| 58 | 3364 | 13 | 105 | 186 | 34596 | 135 | 1081 |
| 59 | 3481 | 13 | 108 | 187 | 34969 | 137 | 1092 |
| 60 | 3600 | 14 | 112 | 188 | 35344 | 138 | 1104 |
| 61 | 3721 | 14 | 116 | 189 | 35721 | 140 | 1116 |
| 62 | 3844 | 15 | 120 | 190 | 36100 | 141 | 1128 |
| 63 | 3969 | 15 | 124 | 191 | 36481 | 143 | 1140 |
| 64 | 4096 | 16 | 128 | 192 | 36864 | 144 | 1152 |
| 65 | 4225 | 16 | 132 | 193 | 37249 | 146 | 1164 |
| 66 | 4356 | 17 | 136 | 194 | 37636 | 147 | 1176 |
| 67 | 4489 | 17 | 140 | 195 | 38025 | 149 | 1188 |
| 68 | 4624 | 18 | 144 | 196 | 38416 | 150 | 1200 |
| 69 | 4761 | 18 | 148 | 197 | 38809 | 152 | 1212 |
| 70 | 4900 | 19 | 153 | 198 | 39204 | 153 | 1225 |
| 71 | 5041 | 19 | 157 | 199 | 39601 | 155 | 1237 |
| 72 | 5184 | 20 | 162 | 200 | 40000 | 156 | 1250 |
| 73 | 5329 | 20 | 166 | 201 | 40401 | 158 | 1262 |
| 74 | 5476 | 21 | 171 | 202 | 40804 | 160 | 1275 |
| 75 | 5625 | 22 | 175 | 203 | 41209 | 161 | 1287 |
| 76 | 5776 | 22 | 180 | 204 | 41616 | 163 | 1300 |
| 77 | 5929 | 22 | 185 | 205 | 42025 | 164 | 1313 |
| 78 | 6084 | 23 | 190 | 206 | 42436 | 166 | 1326 |
| 79 | 6241 | 24 | 195 | 207 | 42849 | 168 | 1339 |
| 80 | 6400 | 25 | 200 | 208 | 43264 | 169 | 1352 |
| 81 | 6561 | 25 | 205 | 209 | 43681 | 171 | 1365 |
| 82 | 6724 | 26 | 210 | 210 | 44100 | 172 | 1378 |
| 83 | 6889 | 27 | 215 | 211 | 44512 | 174 | 1391 |
| 84 | 7056 | 27 | 220 | 212 | 44944 | 176 | 1404 |
| 85 | 7225 | 28 | 225 | 213 | 45369 | 177 | 1417 |
| 86 | 7396 | 29 | 231 | 214 | 45796 | 179 | 1431 |
| 87 | 7569 | 29 | 236 | 215 | 46225 | 181 | 1444 |
| 88 | 7744 | 30 | 242 | 216 | 46656 | 182 | 1458 |
| 89 | 7921 | 31 | 247 | 217 | 47089 | 184 | 1471 |
| 90 | 8100 | 31 | 253 | 218 | 47524 | 186 | 1485 |
| 91 | 8281 | 32 | 258 | 219 | 47961 | 188 | 1498 |
| 92 | 8464 | 33 | 264 | 220 | 48400 | 189 | 1512 |
| 93 | 8649 | 33 | 270 | 221 | 48841 | 191 | 1526 |
| 94 | 8836 | 34 | 276 | 222 | 49284 | 193 | 1540 |
| 95 | 9025 | 35 | 282 | 223 | 49729 | 195 | 1554 |
| 96 | 9216 | 36 | 288 | 224 | 50176 | 196 | 1568 |
| 97 | 9409 | 36 | 294 | 225 | 50625 | 198 | 1582 |

-continued

| 8 Bit Input Video Data (X) | 16 Bit De-gamma Data (X**2) | 8 Bit Output Video Data (X**2/255) | 11 Bit Degamma Data (X**2)/32 | 8 Bit Input Video Data (X) | 16 Bit Degamma Data (X**2) | 8 Bit Out-put Video Data (X**2/255) | 11 Bit Degamma Data (X**2)/32 |
|---|---|---|---|---|---|---|---|
| 98 | 9604 | 37 | 300 | 226 | 51076 | 200 | 1596 |
| 99 | 9801 | 38 | 306 | 227 | 51529 | 202 | 1610 |
| 100 | 10000 | 39 | 312 | 228 | 51984 | 203 | 1624 |
| 101 | 10201 | 40 | 318 | 229 | 52441 | 205 | 1638 |
| 102 | 10404 | 40 | 325 | 230 | 52900 | 207 | 1653 |
| 103 | 10609 | 41 | 331 | 231 | 53361 | 209 | 1667 |
| 104 | 10816 | 42 | 338 | 232 | 53824 | 211 | 1682 |
| 105 | 11025 | 43 | 344 | 233 | 54289 | 212 | 1696 |
| 106 | 11236 | 44 | 351 | 234 | 54756 | 214 | 1711 |
| 107 | 11449 | 44 | 357 | 235 | 55225 | 216 | 1725 |
| 108 | 11664 | 45 | 364 | 236 | 55696 | 218 | 1740 |
| 109 | 11881 | 46 | 371 | 237 | 56169 | 220 | 1755 |
| 110 | 12100 | 47 | 378 | 238 | 56644 | 222 | 1770 |
| 111 | 12321 | 48 | 385 | 239 | 57121 | 224 | 1785 |
| 112 | 12544 | 49 | 392 | 240 | 57600 | 225 | 1800 |
| 113 | 12769 | 50 | 399 | 241 | 58081 | 227 | 1815 |
| 114 | 12996 | 50 | 406 | 242 | 58564 | 229 | 1830 |
| 115 | 13225 | 51 | 413 | 243 | 59049 | 231 | 1845 |
| 116 | 13456 | 52 | 420 | 244 | 59536 | 233 | 1860 |
| 117 | 13689 | 53 | 427 | 245 | 60025 | 235 | 1875 |
| 118 | 13924 | 54 | 435 | 246 | 60516 | 237 | 1891 |
| 119 | 14161 | 55 | 442 | 247 | 61009 | 239 | 1906 |
| 120 | 14400 | 56 | 450 | 248 | 61504 | 241 | 1922 |
| 121 | 14641 | 57 | 457 | 249 | 62001 | 243 | 1937 |
| 122 | 14884 | 58 | 465 | 250 | 62500 | 245 | 1953 |
| 123 | 15129 | 59 | 472 | 251 | 63001 | 247 | 1968 |
| 124 | 15376 | 60 | 480 | 252 | 63504 | 249 | 1984 |
| 125 | 15625 | 61 | 488 | 253 | 64009 | 251 | 2000 |
| 126 | 15876 | 62 | 496 | 254 | 64516 | 253 | 2016 |
| 127 | 16129 | 63 | 504 | 255 | 65025 | 255 | 2032 |

As it can be seen from the values in the columns headed 8 bit output video data, for smaller input values, many input levels are mapped to the same output level. This is due to division by 255 and truncation. In other words, for darker areas, the quantisation step is higher than for the higher areas which corresponds to non-linear quantisation. In particular the values smaller than 16 are all mapped to 0 (this corresponds to four bit video data resolution which is unacceptable for video signal processing).

Dithering is a known technique for avoiding to loose amplitude resolution bits due to truncation This technique only works if the required resolution is available before the truncation step. But this is the case in the present application, because the video data after degamma operation has 16 bit resolution and in the corresponding columns there are no two identical values. Dithering can in principle bring back as many bits as those lost by truncation. However, the dithering noise frequency decreases, and therefore becomes more noticeable, with the number of dithering bits.

1 bit-dithering corresponds to multiply the number of available output levels by 2, 2 bit-dithering corresponds to multiply the number of available output levels by 4 and 3 bit-dithering corresponds to multiply the number of available output levels by 8.

Looking at the table above, in particular to the input values less than 16 reveals that at minimum 3 bit-dithering is required to reproduce the 256 video levels more correctly with the required grey scale portrayal of a 'CRT' display device.

In the table above the columns headed 11 Bit Degamma Data contain the output data from the degamma unit. These values are derived from the values in the columns headed 16 Bit Degamma data by dividing them by 32 or better by truncation of 5 bits. How these values are used in the dithering process will be explained later on.

Next, the cell-based dithering will be explained in detail.

With cell-based dithering a dithering number is added to every panel cell in contrast to every panel pixel as usually done. A panel pixel is composed of three cells: red, green and blue cell. The cell-based dithering has the advantage of rendering the dithering noise finer and thus making it less noticeable to the human viewer.

Because the dithering pattern is defined cell-wise, it is not possible to use techniques like error-diffusion, in order to avoid colouring of the picture when one cell would diffuse in the contiguous cell of a different colour. This is not a big disadvantage, because it has been observed sometimes an undesirable low frequency moving interference, between the diffusion of the truncation error and a moving pattern belonging to the video signal. Error diffusion works best in case of static pictures.

Instead of using error diffusion, a static 3-dimensional dithering pattern is proposed according to this invention.

FIG. 3 shows one example for such a pattern. 3-bit-dithering is used in this example. This means that the dithering numbers have values from 0 to 7. The static 3-dimensional dithering pattern is defined for a cube of 4*4*4 cells (4-lines with 4 cells each, repeatedly taken from 4 frames). It is noted that this embodiment is only an example and that the number of dithering bits as well as the size and type of dithering pattern can be subject of modification in other embodiments of the invention.

The use of a 3 bit-dithering requires that the degamma operation is performed with 3 bits more than final resolution.

The final resolution is given to be 8 bit resolution. The sub-field coding range is therefore from 0 to 255. Then the output range of the degamma operation should be from 0 to 2040. It is noted that the maximum dithering number with 3 bit dithering is 7. If this number is added to 2040, the result is 2047 which is the highest possible 11 bit binary number %11111111111. A slightly lower value than 2040. e.g. 2032 could also be used. This has the advantage that the corresponding values can simply be derived from the 16 bit degamma data by truncating the 5 least significant bits.

Some other examples: if sub-field coding range would be from 0 to 175, output range of degamma operation should be from 0 to 1400; and finally if coding range is from 0 to 127, output range should be from 0 to 1016. For every panel cell and for every frame, the corresponding dither pattern value is added to the output of the degamma function, and consequently truncated to the final number of bits.

The 3-bit dither pattern shown in FIG. 3 is static. This means that it is repeatedly used for the whole panel. From FIG. 3 it can be seen that the dither pattern is repeated in horizontal direction of the panel. However, it also repeats in vertical direction and in time direction accordingly.

It is noted that the proposed pattern, when integrated over time, always gives the same value for all panel cells. If this were not the case, under some circumstances, some cells could acquire an amplitude offset compared to other cells which would correspond to an undesirable fixed spurious static pattern.

Next, the principle of object-based dithering according to the invention is explained in greater detail. Object-based dithering corresponds to modify the number of dithering bits as a function of the displayed object. For this purpose different masking bit patterns are defined which serve as a selector for the dithering bit resolution. E.g., if the object-based dithering is used in combination with the cell-based dithering, the implementation of different dithering bit resolutions can be done as follows.

The dithering pattern as shown in FIG. 3 remains unchanged. I.e., the dithering numbers have the 3 bit resolution as before at the beginning of the dithering process. This is the highest possible bit resolution in this example. For implementing the 4 different bit resolutions 3-bit, 2-bit, 1-bit and 0-bit, 4 different masking values are defined. These are:

3-bit dithering->masko=%111=7H 2-bit dithering->masko=%110=6H 1-bit dithering->masko=%100=4H 0-bit dithering->masko=%000=0H These masking bit patterns are applied to the high resolution dithering numbers by Boolean operation. This can best be explained with some examples. In the examples below the Boolean operation is the logical AND operation.

3-Bit Dithering

| Dithering Number | Masking Bit Pattern | Result |
|---|---|---|
| %111 | %111 | %111 |
| %110 | %111 | %110 |
| %101 | %111 | %101 |
| %100 | %111 | %100 |
| %011 | %111 | %011 |
| %010 | %111 | %010 |
| %001 | %111 | %001 |
| %000 | %111 | %000 |

2-Bit Dithering

| Dithering Number | Masking Bit Pattern | Result |
|---|---|---|
| %111 | %110 | %110 |
| %110 | %110 | %110 |
| %101 | %110 | %100 |
| %100 | %110 | %100 |
| %011 | %110 | %010 |
| %010 | %110 | %010 |
| %001 | %110 | %000 |
| %000 | %110 | %000 |

1-Bit Dithering

| Dithering Number | Masking Bit Pattern | Result |
|---|---|---|
| %111 | %100 | %100 |
| %110 | %100 | %100 |
| %101 | %100 | %100 |
| %100 | %100 | %100 |
| %011 | %100 | %000 |
| %010 | %100 | %000 |
| %001 | %100 | %000 |
| %000 | %100 | %000 |

0-Bit Dithering

| Dithering Number | Masking Bit Pattern | Result |
|---|---|---|
| %111 | %000 | %000 |
| %110 | %000 | %000 |
| %101 | %000 | %000 |
| %100 | %000 | %000 |
| %011 | %000 | %000 |
| %010 | %000 | %000 |
| %001 | %000 | %000 |
| %000 | %000 | %000 |

From the table for 3-bit dithering it is clear that the applied masking bit pattern has no effect on the dithering numbers. They remain unchanged and therefore, 3-bit dithering is preserved as wanted.

From the table for 2-bit dithering it is clear that the applied masking bit pattern converts the 3-bit dithering numbers into 2-bit dithering numbers. There result only 4 different output values which corresponds to 2-bit dithering as wanted.

From the table for 1-bit dithering it is clear that the applied masking bit pattern converts the 3-bit dithering numbers into 2-bit dithering numbers. There result only 2 different output values which corresponds to 1-bit dithering as wanted.

From the table for 0-bit dithering it is clear that the applied masking bit pattern converts the 3-bit dithering numbers into 0-bit dithering numbers. Every input dithering number is converted to 0 which corresponds to 0-bit dithering as wanted.

The dithering bit resolution selection with masking bit patterns has the advantage that there need not be different tables for dithering patterns and different algorithms. So that the presented solution is very efficient.

In a practical application OSD insets are coded with 0-bit dithering while the video picture is coded with 3-bit dithering. If the plasma display panel is used as a monitor for computers, window borders and icons, as well as documents might be displayed with 0-bit dithering, while wall-papers and windows with motion pictures (video scenes), e.g. AVI-files or MPG-files might have 1-bit, 2-bit or 3-bit dithering enabled.

If a video picture has been coded according to the MPEG-4 standard the object/region-based dithering can benefit from this coding. The MPEG-4 standard provides the tools for video object coding. This means that the different objects in a video scene are coded independently. In a further embodiment of the invention the number of dithering bits for the cells of an object in a picture are adapted to the kind and to the bit-resolution of the objects belonging to a given MPEG-4 sequence. For instance very often the background is darker than the rest of the picture and has low contrast. In this region the application of 3-bit dithering is therefore used. The foreground is very often brighter and mostly more rich in contrast. In this region 1 bit dithering is therefore more appropriate.

Of course, object-based dithering requires some kind of information from the video source regarding video objects. This requires a picture content analysis which can be very complicated to implement. If in a low cost application this picture content analysis implementation is considered to be too expensive, then a low cost implementation of object-based dithering can be the restriction to switching off dithering in case of On-Screen-Display insets and switching on dithering for the rest of the picture.

Next, the principle of amplitude-based dithering according to the invention is explained in greater detail. Amplitude-based dithering corresponds to modify the number of dithering bits as a function of the video component signal amplitude. This can be done in similar fashion like for the object-based dithering. There are also defined some masking bit patterns for the different amplitude ranges which are used to select a corresponding dithering bit resolution by Boolean operation with the dithering numbers.

In video technology the video signal component value range is usually from 0 to 255 (8 bit words). This range is subdivided in e.g. 4 sections. The ranges and the assigned corresponding masking bit patterns are shown below:

For (0<=X<32), maska=%111=7H, for (32<=X<64), maska=%110=6H, for (64<=X<128), maska=%100=4H, for (128<=X<=255), maska=%000=0H, where X is the amplitude of the input video component R,G,B.

According to this embodiment of the invention in the dithering circuit section the input video signal components will be classified with respect to the amplitude range. The dithering number from the dithering pattern is taken in 3-bit resolution and the logical AND operation is performed with the corresponding masking bit pattern. The resulting value is added to the video signal component data. This is done separately for each cell. The same principle is used for object-based dithering.

Next, it is explained in greater detail how the three different dithering techniques, cell-, amplitude- and object-based dithering can be combined for an optimisation.

Taking in consideration the above mentioned example with 3-bit dithering numbers, a combined solution can be described with the following formulae:

Rout=trunc[degamma[Rin]+(rdither[$x,y,z$] AND maska[Rin,$x,y,z$] AND masko[$x,y,z$])]

Gout=trunc[degamma[Gin]+(gdither[$x,y,z$] AND maska[Gin,$x,y,z$] AND masko[$x,y,z$])]

Bout=trunc[degamma[Bin]+(bdither[$x,y,z$] AND maska[Bin,$x,y,z$] AND masko[$x,y,z$])]

where

Rin denotes the video level of the red input video signal component R,

Gin denotes the video level of the green input video signal component G,

Bin denotes the video level of the blue input video signal component B, degamma[ ] denotes the degamma function with 11 bit resolution, maska[ ] denotes the amplitude-based masking value, masko[ ] denotes the object-based masking value, rdither[ ] denotes the cell based dithering number for the red cells according to the used dithering pattern, gdither[ ] denotes the cell based dithering number for the green cells according to the dithering pattern, bdither[ ] denotes the cell based dithering number for the blue cells according to the dithering pattern, x denotes the panel pixel number, y denotes the panel line number, z denotes the frame number and trunc [ ] denotes truncation to 8 bit resolution, i.e. truncation of the 3 least significant bits.

The expressions:

(rdither [x,y,z] AND maska [Rin,x,y,z] AND masko [x,y,z])], (gdither [x,y,z] AND maska [Gin,x,y,z] AND masko [x,y,z])], (bdither [x,y,z] AND maska [Bin,x,y,z] AND masko [x,y,z])]

therefore denote a resulting dithering number after combination with the masking bit patterns from object- and amplitude-based dithering.

The results of this calculations is illustrated in the following tables below. The results are only shown exemplarily for three input values 8, 21, 118. This is because the full table cannot be easily displayed on paper. The effect of dithering is however obvious already from the tables below. The first table concerns the example of 3-bit dithering. It is evident that for the input value 8 due to dithering the output value is changed from 0 to 1 in two cases compared to the embodiment without dithering. For the input value 21 the output value is changed from 1 to 2 in five cases compared to the case without dithering. For the input value 118 the output value is changed from 54 to 55 in three cases. Of course, the effect of dithering is becoming smaller as the input value increases because the ratio between dithering value to input value decreases.

Maska = masko = %111 = 3-bit dithering

| 8 Bit Input Video Data | 16 Bit Degamma Data | 8 Bit Degamma Data | 11 Bit Degamma Data | Dithering Number | 8 Bit Output Video Data |
|---|---|---|---|---|---|
| 8 | 64 | 0 | 2 | 7 | 1 |
| | | | | 6 | 1 |
| | | | | 5 | 0 |
| | | | | 4 | 0 |
| | | | | 3 | 0 |
| | | | | 2 | 0 |
| | | | | 1 | 0 |
| | | | | 0 | 0 |

-continued

Maska = masko = %111 = 3-bit dithering

| 8 Bit Input Video Data | 16 Bit De-gamma Data | 8 Bit De-gamma Data | 11 Bit De-gamma Data | Dithering Number | 8 Bit Output Video Data |
|---|---|---|---|---|---|
| 21 | 441 | 1 | 13 | 7 | 2 |
| | | | | 6 | 2 |
| | | | | 5 | 2 |
| | | | | 4 | 2 |
| | | | | 3 | 2 |
| | | | | 2 | 1 |
| | | | | 1 | 1 |
| | | | | 0 | 1 |
| 118 | 13924 | 54 | 435 | 7 | 55 |
| | | | | 6 | 55 |
| | | | | 5 | 55 |
| | | | | 4 | 54 |
| | | | | 3 | 54 |
| | | | | 2 | 54 |
| | | | | 1 | 54 |
| | | | | 0 | 54 |

The next table lists the calculation results for 2-bit dithering. Here, the effect of dithering is of course getting smaller, as smaller dithering numbers are added. However, a difference is present only for the input value 18 where the output value is changed in only four cases and for the input value 118, where the output value is changed from 54 to 55 in only two cases.

Maska = masko = %110 = 2-bit dithering

| 8 Bit Input Video Data | 16 Bit De-gamma Data | 8 Bit De-gamma Data | 11 Bit De-gamma Data | Dithering Number | 8 Bit Output Video Data |
|---|---|---|---|---|---|
| 8 | 64 | 0 | 2 | 7 | 1 |
| | | | | 6 | 1 |
| | | | | 5 | 0 |
| | | | | 4 | 0 |
| | | | | 3 | 0 |
| | | | | 2 | 0 |
| | | | | 1 | 0 |
| | | | | 0 | 0 |
| 21 | 441 | 1 | 13 | 7 | 2 |
| | | | | 6 | 2 |
| | | | | 5 | 2 |
| | | | | 4 | 2 |
| | | | | 3 | 1 |
| | | | | 2 | 1 |
| | | | | 1 | 1 |
| | | | | 0 | 1 |
| 118 | 13924 | 54 | 435 | 7 | 55 |
| | | | | 6 | 55 |
| | | | | 5 | 54 |
| | | | | 4 | 54 |
| | | | | 3 | 54 |
| | | | | 2 | 54 |
| | | | | 1 | 54 |
| | | | | 0 | 54 |

The next table lists the calculation results for 1-bit dithering. Here, the effect of dithering has vanished for the input vales 8 and 118 but for the input value 21 there is still the effect that the output values have been changed from 1 to 2 in four cases. Of course there are other input values, like 12, where the effect is maintained.

Maska = masko = %100 = 1-bit dithering

| 8 Bit Input Video Data | 16 Bit De-gamma Data | 8 Bit De-gamma Data | 11 Bit De-gamma Data | Dithering Number | 8 Bit Output Video Data |
|---|---|---|---|---|---|
| 8 | 64 | 0 | 2 | 7 | 0 |
| | | | | 7 | 0 |
| | | | | 6 | 0 |
| | | | | 5 | 0 |
| | | | | 4 | 0 |
| | | | | 3 | 0 |
| | | | | 2 | 0 |
| | | | | 1 | 0 |
| | | | | 0 | 0 |
| 21 | 441 | 1 | 13 | 7 | 2 |
| | | | | 6 | 2 |
| | | | | 5 | 2 |
| | | | | 4 | 2 |
| | | | | 3 | 1 |
| | | | | 2 | 1 |
| | | | | 1 | 1 |
| | | | | 0 | 1 |
| 118 | 13924 | 54 | 435 | 7 | 54 |
| | | | | 6 | 54 |
| | | | | 5 | 54 |
| | | | | 4 | 54 |
| | | | | 3 | 54 |
| | | | | 2 | 54 |
| | | | | 1 | 54 |
| | | | | 0 | 54 |

Figure 4:
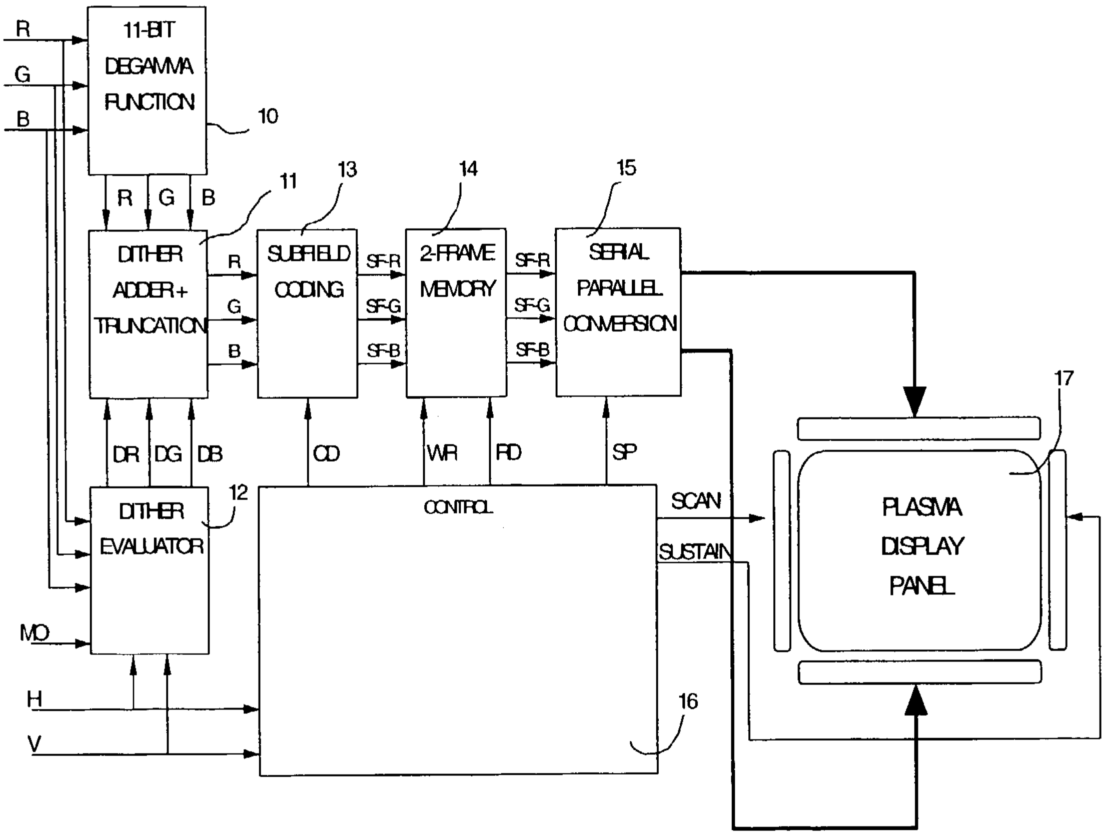
FIG. 4 shows a block diagram of a circuit implementation of the invention in a PDP.

In FIG. 4 a circuit implementation of the invention is illustrated. Input R,G,B video data is forwarded to degamma unit 10 and a dither evaluation unit 12. The degamma unit 10 performs the 11-bit degamma function and delivers 11 bit video data R,G,B at the output. The dither evaluation unit 12 computes the dithering numbers: DR for red, DG for green and DB for blue. To do that it requires the sync signals H and V to determine which pixel is currently processed and which line and frame number is valid. These information is used for addressing a lookup table in which the dithering pattern is stored. The R, G and B components are used in this unit for evaluating the amplitude masking values maska. The masking value MO, which is the object-based masking value for the current pixel, is delivered by a unit in the video source, like MPEG4 decoder. This unit is not shown. In the case that no such unit is available, the signal MO can be replaced by the fast blanking signal of an external OSD insertion circuit. Unit 12 also performs the Boolean operations according to above discussed formulae. In calculation unit 11 the resulting dithering numbers and the degamma output values are added and the 3 least significant bits of the result are truncated so that the final output values Rout, Gout and Bout are achieved. These values are forwarded to a sub-field coding unit 13 which performs sub-field coding under control of control unit 16. The sub-field code words are stored in memory unit 14. Reading and writing from and to this memory unit is also controlled by the external control unit 16. For plasma display panel addressing, the sub-field code words are read out of the memory device and all the code words for one line a collected in order to create a single very long code word which can be used for the line wise PDP addressing. This is carried out in the serial to parallel conversion unit 15. The control unit 16 generates all scan and sustain pulses for PDP control. It receives horizontal and vertical synchronising signals for reference timing.

The invention can be used in particular in PDPs. Plasma displays are currently used in consumer electronics, e.g. for TV sets, and also as a monitor for computers. However, use of the invention is also appropriate for matrix displays where the light emission is also controlled with small pulse in sub-fields, i.e. where the PWM principle is used for controlling light emission.

What is claimed is:

1. Method for processing RGB video picture data having a video (signal) level for display on a display device having a plurality of luminous elements corresponding to the colour components of pixels of a video picture, wherein a dithering method is applied to the video data to refine a grey-scale portrayal for displaying the video pictures, wherein, within the dithering method the input video data is converted to higher bit resolution and dithering numbers are added to the input video data in higher bit resolution, followed by a step with which the input video data is converted to final bit resolution, the dithering method including at least one of:

(a) the dithering is made cell-based such that to each colour component R, G, B of a given pixel, and dependent on the identity of the colour component, a different dithering number from a dither pattern is added to each colour component of a given pixel, wherein the dither pattern comprises different dithering numbers from a set of dithering numbers;

(b) the bit resolution of the dithering numbers is made dependent on a region/object in the video picture; and (c) the bit resolution of the dithering numbers is made dependent on the video (signal) level.

2. Method according to claim 1, wherein for the cell-based dithering the video picture is divided into a number of sections and a static 3-dimensional dithering pattern is defined which is used repeatedly in a video sequence, wherein a first dimension corresponds to a video line number, a second dimension corresponds to a number of cells within a video line section and a third dimension corresponds to a number of video frames.

3. Method according to claim 2, wherein the static 3-dimensional dithering pattern is defined for a section of 4 lines with 4 cells each for a number of 4 consecutive frames with a bit-resolution for the dithering numbers of 3 bits.

4. Method according to claim 1, wherein for the region/object-based dithering, the information about different video objects/region is taken over from an MPEG4 data stream.

5. Method according to claim 1, wherein to each of the specific sets of dithering numbers for the dithering process, a corresponding masking bit pattern is assigned which determines by Boolean operation which of the bits of a high resolution dithering number are to be taken for the resulting final dithering number.

6. Method according to claim 1, wherein for the video level-based dithering, a full range of the video (signal) level is subdivided in a number of sections and to each section a corresponding masking bit pattern is assigned which determines by Boolean operation which of the bits of a high resolution dithering number are to be taken for the resulting final dithering number.

7. Method according to claim 6, wherein the full video level range from 0 to 255 is subdivided in 4 sections, in particular 0 to 31, 32 to 63, 64 to 127, and 128 to 255 and correspondingly the following bit resolutions are used for the ranges, 3-bit, 2-bit, 1-bit, 0-bit and wherein the bit resolution decreases as the video level range increases.

8. Method according to claim 1, wherein for the combined use of all the dithering specialities the following formulae are applied:

$$Rout=trunc[degamma[Rin]+(rdither[x,y,z] \text{ AND } maska[Rin,x,y,z] \text{ AND } masko[x,y,z])]$$

$$Gout=trunc[degamma[Gin]+(gdither[x,y,z] \text{ AND } maska[Gin,x,y,z] \text{ AND } masko[x,y,z])]$$

$$Bout=trunc[degamma[Bin]+(bdither[x,y,z] \text{ AND } maska[Bin,x,y,z] \text{ AND } masko[x,y,z])],$$

where

Rin denotes the video level of the red input video signal component R,

Gin denotes the video level of the green input video signal component G,

Bin denotes the video level of the blue input video signal component B, degamma[ ] denotes the degamma function with specific bit resolution, in particular 11-bit resolution, maska[ ] denotes the amplitude-based masking value, masko[ ] denotes the object-based masking value, rdither[ ] denotes the cell-based dithering number for the red cells according to the used dithering pattern, gdither[ ] denotes the cell-based dithering number for the green cells according to the used dithering pattern, bdither[ ] denotes the cell-based dithering number for the blue cells according to the used dithering pattern, x denotes the panel pixel number, y denotes the panel line number, z denotes the frame number, and trunc[ ] denotes truncation to a specific bit resolution, in particular 8-bit resolution.

9. Method according to claim 1, wherein the method is used for the video signal processing in a Plasma display device.

10. Apparatus for processing video pictures having a grey-scale portrayal for display on a display device having a plurality of luminous elements corresponding to the RGB colour components of pixels of a video picture, said apparatus comprising a dithering unit which calculates dithering numbers that are added to video picture data having a video (signal) level to refine the grey-scale portrayal in the video pictures, wherein, within the dithering unit conversion means that convert the input video data to higher bit resolution are comprised addition means that add dithering numbers to the input video data in higher bit resolution, and processing means performing a step with which the input video data is converted to final bit resolution, the dithering unit calculating dithering numbers according to at least one of:

(a) applying different dithering numbers for the RGB colour components so that, dependent on the identity of the colour component, a different dithering number from a dither pattern is added to each of the RGB components of a given pixel; wherein the dither pattern comprises different dithering numbers from a set of dithering numbers;

(b) selecting the bit resolution of dithering numbers dependent on the region/object in the video picture; and (c) selecting the bit resolution of the dithering numbers dependent on the video (signal) level.

* * * * *